(12) United States Patent
Chen

(10) Patent No.: US 8,303,149 B2
(45) Date of Patent: Nov. 6, 2012

(54) ASSEMBLED LIGHT-GUIDING MODULE WITH HIGH LIGHT-GUIDING EFFICIENCY

(76) Inventor: Chien-Chung Chen, Taipei (TW)

( * ) Notice: Subject to any disclaimer, the term of this patent is extended or adjusted under 35 U.S.C. 154(b) by 681 days.

(21) Appl. No.: 12/500,261

(22) Filed: Jul. 9, 2009

(65) Prior Publication Data

US 2010/0110717 A1  May 6, 2010

(30) Foreign Application Priority Data

Nov. 3, 2008  (TW) ............................... 97142336 A

(51) Int. Cl.
*G02B 6/00* (2006.01)

(52) U.S. Cl. ......... 362/551; 362/555; 362/612; 362/613

(58) Field of Classification Search .................. 362/612, 362/613, 551, 555
See application file for complete search history.

(56) References Cited

U.S. PATENT DOCUMENTS

| | | | | |
|---|---|---|---|---|
| 4,954,931 A * | 9/1990 | Hassler, Jr. | ..................... | 362/555 |
| 5,700,077 A * | 12/1997 | Dreyer et al. | .................. | 362/551 |
| 5,980,063 A * | 11/1999 | Ford et al. | ..................... | 362/186 |
| 6,337,946 B1 * | 1/2002 | McGaffigan | .................. | 385/146 |
| 6,857,771 B2 * | 2/2005 | Guerrieri | ....................... | 362/555 |
| 7,503,673 B2 * | 3/2009 | Chou | ............................. | 362/240 |
| 7,549,782 B2 * | 6/2009 | Ng et al. | ........................ | 362/555 |
| 7,565,050 B2 * | 7/2009 | Lee et al. | ....................... | 385/133 |
| 7,972,053 B2 * | 7/2011 | Hatti et al. | .................... | 362/628 |
| 7,988,322 B2 * | 8/2011 | Zheng | ............................ | 362/218 |
| 2001/0048603 A1 * | 12/2001 | Ohuchi | ......................... | 362/555 |

* cited by examiner

*Primary Examiner* — Anabel Ton
(74) *Attorney, Agent, or Firm* — C. G. Mersereau; Nikolai & Mersereau, P.A.

(57) ABSTRACT

An assembled light-guiding module with high light-guiding efficiency is composed of a plurality of light-guiding structures. Each light-guiding structure includes a light-guiding body unit and a light-reflecting microstructure unit. The light-guiding body unit has a light-guiding portion, at least one concave light-entering portion is formed on one end of the light-guiding portion, and a hollow portion is formed on a plane surface of the light-guiding portion. The light-reflecting microstructure unit has a plurality of light-reflecting microstructures disposed in the hollow portion. Thereby, the light-guiding structures are assembled to form a light pipe, wherein the concave light-entering portions are mated to form a light-entering groove on one end of the light pipe, and the hollow portions are mated to form a cavity space that is embedded in the light pipe.

17 Claims, 15 Drawing Sheets

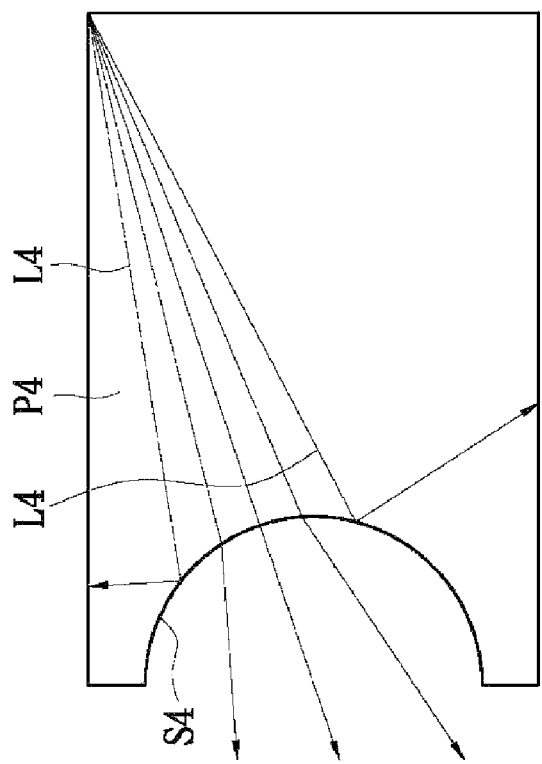
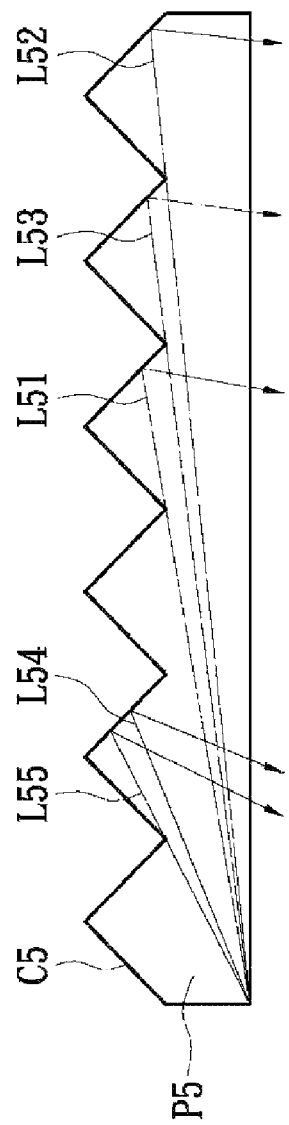
FIG. 1D
PRIOR ART
FIG. 1E
PRIOR ART

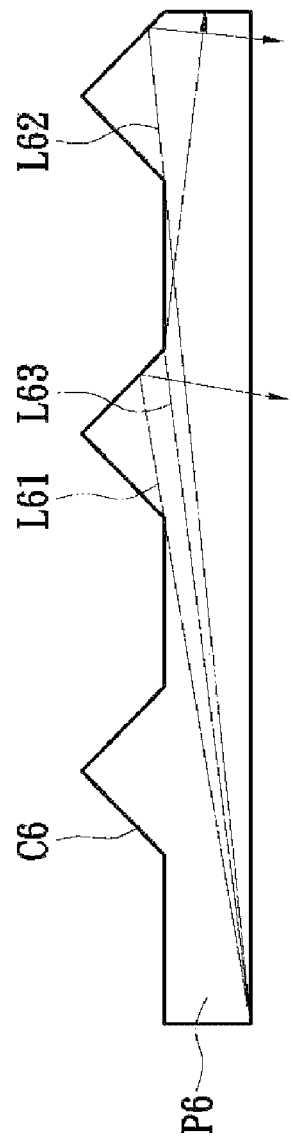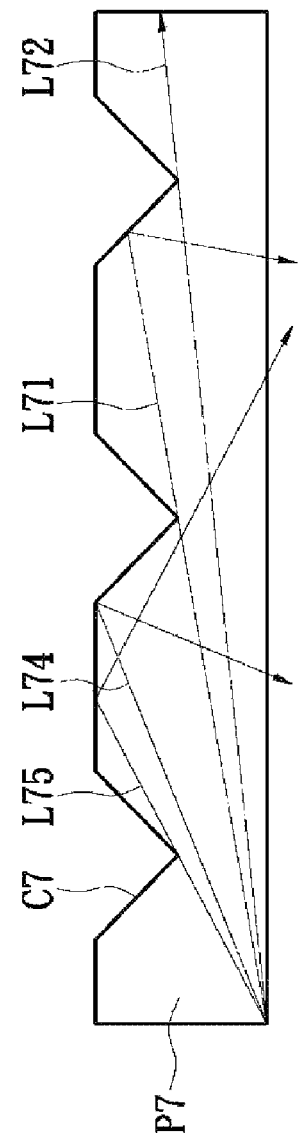
FIG. 1F
PRIOR ART
FIG. 1G
PRIOR ART

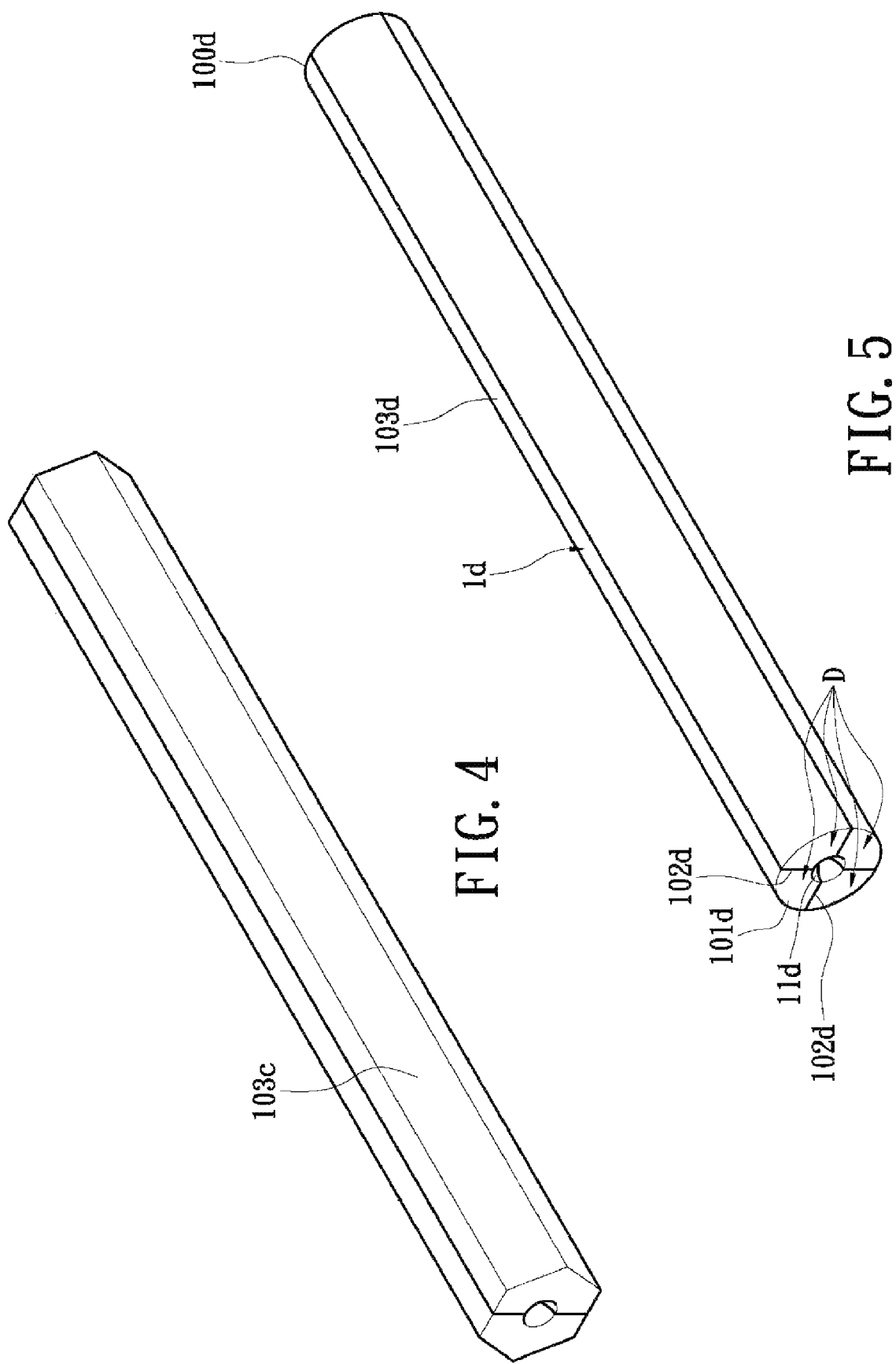

ASSEMBLED LIGHT-GUIDING MODULE WITH HIGH LIGHT-GUIDING EFFICIENCY

BACKGROUND OF THE INVENTION

1. Field of the Invention

The present invention relates to an assembled light-guiding module, and particularly relates to an assembled light-guiding module with high light-guiding efficiency.

2. Description of Related Art

The design of a conventional light pipe includes the following relevant factors:

1. Light Entrance Surface:

Referring to FIGS. 1A and 1B, when the projected direction of light beam (L10 or L20) is vertical to the light entrance surface, then the reflective rate of the light beams (L10, L20) are at their lowest. The light entrance surface S1 of the light pipe P1 as shown in FIG. 1A is usually a planar surface due to the cost of molding. Therefore, considering that if the entrance angle of the light beam L11 gets larger, then most of energy of the light beam L11 will not enter the light pipe P1 due to reflection. On the other hand, if the light entrance surface S2 of the light pipe P2 is a concave hemispherical surface as shown in FIG. 1B, then most of the energy of the light beam L21 will enter the light pipe P2; yet as mentioned before, the cost for molding increases correspondingly.

2. Light Exiting Surface:

Referring to FIG. 1C, the light exiting surface S3 of the light pipe P3 is usually a planar surface due to the cost of molding. The light exiting surface S3 is far away from the light source, so that the projected directions of the light beams are approximately vertical to the light exiting surface S3. Hence, most of the energy of the light beam L3 would exit from the light pipe P3.

Referring to FIG. 1D, when the light exiting surface S4 of the light pipe P4 is a concave hemispherical surface, most of the energy of the light beam L4 will not exit out of the light pipe P4 due to the total reflection principle. However, the molding cost is increased.

3. Light Pipe Material:

In generally, the light pipe is made of high density translucent material, and the appearance of the light pipe is smooth. Therefore, the light beams are totally reflected in the light pipe until light beams exit out of the light pipe□ unless the projected directions of the light beams are changed by small concave or convex points.

4. Light Reflecting Microstructure:

In consideration of the molding cost, the microstructure C6 as shown in FIG. 1F is formed by a mold with concave microstructure. Hence, the manufacture of the microstructure C6 in FIG. 1F is easier than that of the microstructure C7 in FIG. 1G.

Comparing FIG. 1E with FIG. 1F, the projected directions of the light beams L51, L52 are changed by the sawtooth microstructure C5, and then the light beams L51, L52 immediately exit out of the light pipe P5. The projected directions of the light beams L61, L62 are changed by the sawtooth microstructure C6 and then the light beams L61, L62 immediately exit out of the light pipe P6. The projected direction of the light beam L53 is changed by the sawtooth microstructure C5 and then the light beam L53 that is reflected between the light beams L51, L52 immediately exit out of the light pipe P5. On the other hand, the light beam L63 is totally reflected in the light pipe P6 and does not exit out of the light pipe P6 immediately.

Comparing FIG. 1E with FIG. 1G, the projected directions of the light beams L71, L72, or L74 are changed by the sawtooth microstructure C7 and then the light beams L71, L72, or L74 exit out of the light pipe P7. The projected directions of the light beams L51, L52, or L54 are changed by the sawtooth microstructure C5 and then the light beams L51, L52, or L54 exit out of the light pipe P5. However, the positions of changing the projected directions of the light beams L71, L72 or L74 from the light entrance surface are farther than the positions of changing the projected directions of the light beams L51, L52 or L54 from the light entrance surface. The light beam L75 is totally reflected in the light pipe P7 and would not exit out of the light pipe P7 immediately. The projected direction of the light beam L55 is changed by the sawtooth microstructure C5 before the projected direction of the light beam L54 is changed, and then the light beam L55 exit out of the light pipe P5.

Comparing, FIG. 1F, with FIG. 1G, the numbers of the sawtooth microstructures C6, C7 are the same. Since the sawtooth microstructures C6 are extends out of the light pipe P6, the effective reflective area of the sawtooth microstructures C6 is smaller than that of the sawtooth microstructures C7. Hence, the light-exiting efficiency of the light pipe P7 is better than that of light pipe P6. However, the cost of the light pipe P7 is also higher than that of light pipe P6.

5. The Reflective Light Beams can be Fully Utilized on Light Exiting Surface:

The light exiting surface indicates the plane on which the reflective microstructures has been formed or the corresponding surface that is parallel to the plane on which the reflective microstructures has been formed.

SUMMARY OF THE INVENTION

One particular aspect of the present invention is to provide an assembled light-guiding module with high light-guiding efficiency. The assembled light-guiding module can be assembled by using different light-guiding bodies and different light-reflecting microstructures according to different light-guiding requirements, such as the magnitude of light power and the direction of light-projecting angles, in order to achieve the objective of customization. In other words, the assembled light-guiding module can be composed of a plurality of light-guiding structures that are symmetrical to each other. The assembled light-guiding module has a plurality of embedded light-reflecting microstructures therein, and the light-reflecting microstructures are selectively disposed on the inner surface of cavity in the light-guiding structures. Therefore, the molding cost can be reduced due to the symmetrical light-guiding structures, and furthermore the present invention can conform to customization requirements due to the above-mentioned flexible assembly design.

In order to achieve the above-mentioned aspects, the present invention provides an assembled light-guiding module with high light-guiding efficiency composed of a plurality of light-guiding structures. Each light-guiding structure includes a light-guiding body unit and a light-reflecting microstructure unit. The light-guiding body unit has a light-guiding portion, at least one concave light-entering portion formed on one end of the light-guiding portion, and a hollow portion formed on a plane surface of the light-guiding portion. The light-reflecting microstructure unit has a plurality of light-reflecting microstructures disposed in the hollow portion. Thereby, the light-guiding structures are assembled to form a light pipe, wherein the concave light-entering portions are mated to form a light-entering groove on one end of the light pipe, and the hollow portions are mated to form a cavity space that is embedded in the light pipe.

In order to achieve the above-mentioned aspects, the present invention provides an assembled light-guiding module with high light-guiding efficiency, including: at least one first light-guiding structure and at least one second light-guiding structure. The first light-guiding structure includes a first light-guiding body unit and a light-reflecting microstructure unit. The first light-guiding body unit has a first light-guiding portion, at least one first concave light-entering portion formed on one end of the first light-guiding portion, and a first hollow portion formed on a plane surface of the first light-guiding portion. The light-reflecting microstructure unit has a plurality of light-reflecting microstructures disposed in the first hollow portion. The second light-guiding structure includes a second light-guiding body unit having a second light-guiding portion, at least one second concave light-entering portion formed on one end of the second light-guiding portion, and a second hollow portion formed on a plane surface of the second light-guiding portion. Thereby, the first light-guiding structure and the second light-guiding structure are assembled to form a light pipe, wherein the first concave light-entering portion and the second concave light-entering portion are mated to form a light-entering groove on one end of the light pipe, and the first hollow portion and the second hollow portion are mated to form a cavity space that is embedded in the light pipe.

In order to achieve the above-mentioned aspects, the present invention provides an assembled light-guiding module with high light-guiding efficiency composed of a plurality of first light-guiding structures and a plurality of second light-guiding structures. Each first light-guiding structure includes a first light-guiding body unit and a light-reflecting microstructure unit. The first light-guiding body unit has a first light-guiding portion, at least one first concave light-entering portion formed on one end of the first light-guiding portion, and a first hollow portion formed on a plane surface of the first light-guiding portion. The light-reflecting microstructure unit has a plurality of light-reflecting microstructures disposed in the first hollow portion. Each second light-guiding structure includes a second light-guiding body unit having a second light-guiding portion, at least one second concave light-entering portion formed on one end of the second light-guiding portion, and a second hollow portion formed on a plane surface of the second light-guiding portion. Thereby, the first light-guiding structure and the second light-guiding structure are assembled to form a light pipe, wherein the first concave light-entering portion and the second concave light-entering portion are mated to form a light-entering groove on one end of the light pipe, and the first hollow portion and the second hollow portion are mated to form a cavity space that is embedded in the light pipe.

It is to be understood that both the foregoing general description and the following detailed description are exemplary, and are intended to provide further explanation of the present invention as claimed. Other advantages and features of the present invention shall be apparent from the following description, drawings, and claims.

BRIEF DESCRIPTION OF THE DRAWINGS

The various objectives and advantages of the present invention shall be more readily understood from the following detailed description when read in conjunction with the appended drawings, in which:

FIG. 1D is a schematic view of a fourth type of a light pipe according to the prior art;

FIG. 1E is a schematic view of a fifth type of a light pipe according to the prior art;

FIG. 1F is a schematic view of a sixth type of a light pipe according to the prior art;

FIG. 1G is a schematic view of a seventh type of a light pipe according to the prior art;

FIG. 4 is a perspective, assembled view of an assembled light-guiding module with high light-guiding efficiency according to the third embodiment of the present invention;

FIG. 5 is a perspective, assembled view of an assembled light-guiding module with high light-guiding efficiency according to the fourth embodiment of the present invention;

DETAILED DESCRIPTION OF THE PREFERRED EMBODIMENTS

Figure 1C:
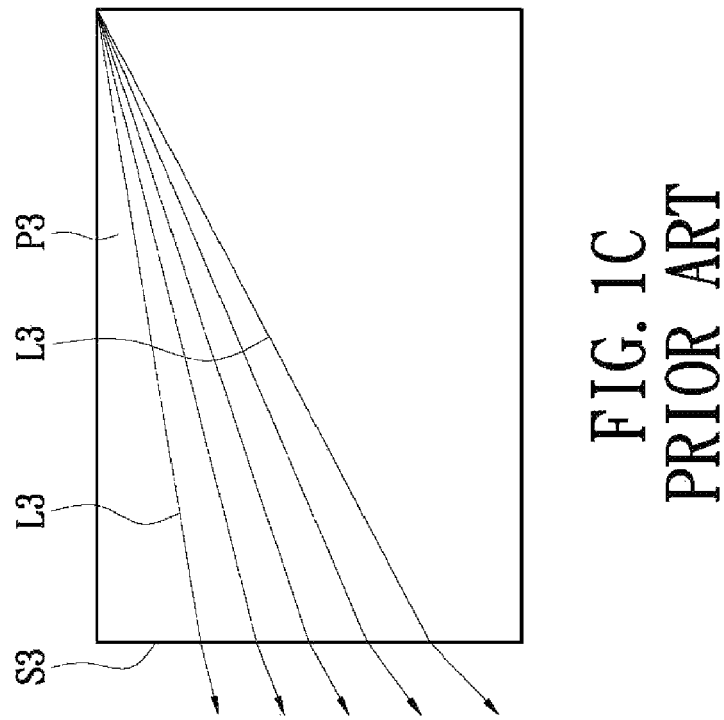
FIG. 1C is a schematic view of a third type of a light pipe according to the prior art.
Figure 1A:
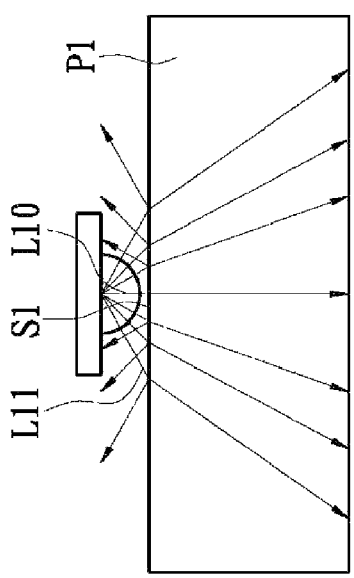
FIG. 1A is a schematic view of a first type of a light pipe according to the prior art.
Figure 1B:
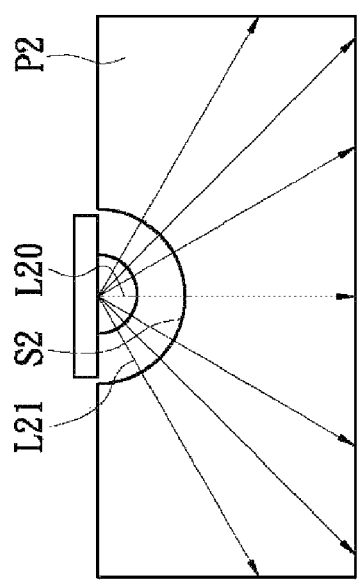
FIG. 1B is a schematic view of a second type of a light pipe according to the prior art.

Referring to FIGS. 2A to 2E, the first embodiment of the present invention provides an assembled light-guiding module with high light-guiding efficiency composed of two light-guiding structures A.

Each light-guiding structure A includes: a light-guiding body unit 1a and a light-reflecting microstructure unit 2a. The light-guiding body unit 1a has a light-guiding portion 10a, two concave light-entering portions 11a respectively formed on two opposite ends of the light-guiding portion 10a, a hollow portion 12a formed on a plane surface of the light-guiding portion 10a, and two convex light-entering portions 13a respectively formed at two opposite ends of the hollow portion 12a. In addition, the two light-guiding structures A have the same shape, so that the two light-guiding structures A can be made using the same mold. Hence, the molding cost of the present invention can be reduced.

According to different designs requirements, the present invention may use only one concave light-entering portion 11a formed on one end of the light-guiding portion 10a and only one convex light-entering portion 13a formed at one end of the hollow portion 12a. Hence, the number and the position of the concave light-entering portions 11a and the convex light-entering portions 13a can be adjusted according to different requirements.

Moreover, each light-guiding portion 10a has two end surfaces (10a, 101a), a mating surface 102a formed between the two end surfaces (100a, 101a), and a light-exiting surface 103a formed between the two end surfaces (100a, 101a) and opposite to the mating surface 102a. One concave light-entering portion 11a is formed between one end surface 100a and the mating surface 102a, and another concave light-entering portion 11a is formed between another end surface 101a and the mating surface 102a. The hollow portion 12a is formed on the mating surface 102a. In other words, one partial area of the mating surface 102a is concaved downwards to form a concave reflective surface as the hollow portion 12a, and the shape of the concave reflective surface can be changed according to different requirements of optical uniformities and optical brightness. In addition, the light-exiting surface 103a can be an arc surface or one surface of a polygon. In the first embodiment, the light-exiting surface 103a is an arc surface. Hence, when light beams (not shown) are projected outwards from the light-exiting surface 103a, the light beams are condensed by the light-exiting surface 103a.

Furthermore, the light-reflecting microstructure unit 2a has a plurality of light-reflecting microstructures 20a disposed in the hollow portion 12a. Each light-reflecting microstructure 20a can be a semi-spherical shape, a cylindrical shape, a triangular prism shape, a saw tooth shape, or other convex shape. In the first embodiment, each light-reflecting microstructure 20a has a semi-spherical shape.

Figure 2A:
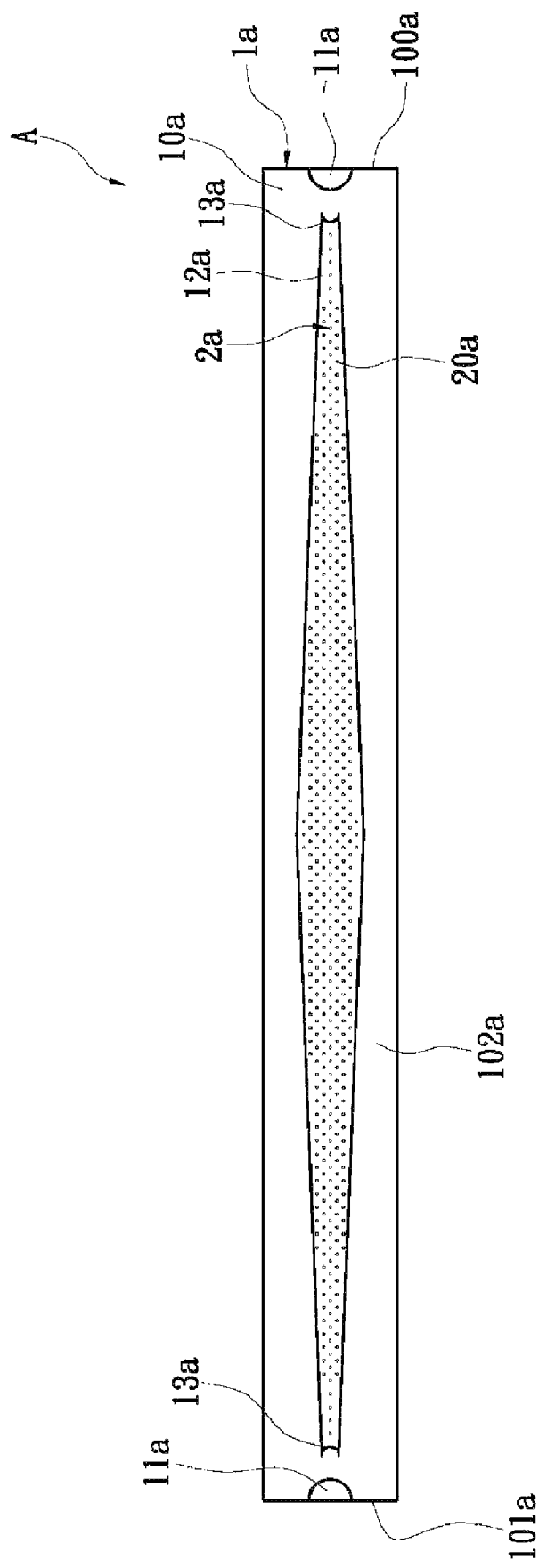
FIG. 2A is a lateral, schematic view of an assembled light-guiding module with high light-guiding efficiency according to the first embodiment of the present invention.
Figure 2B:
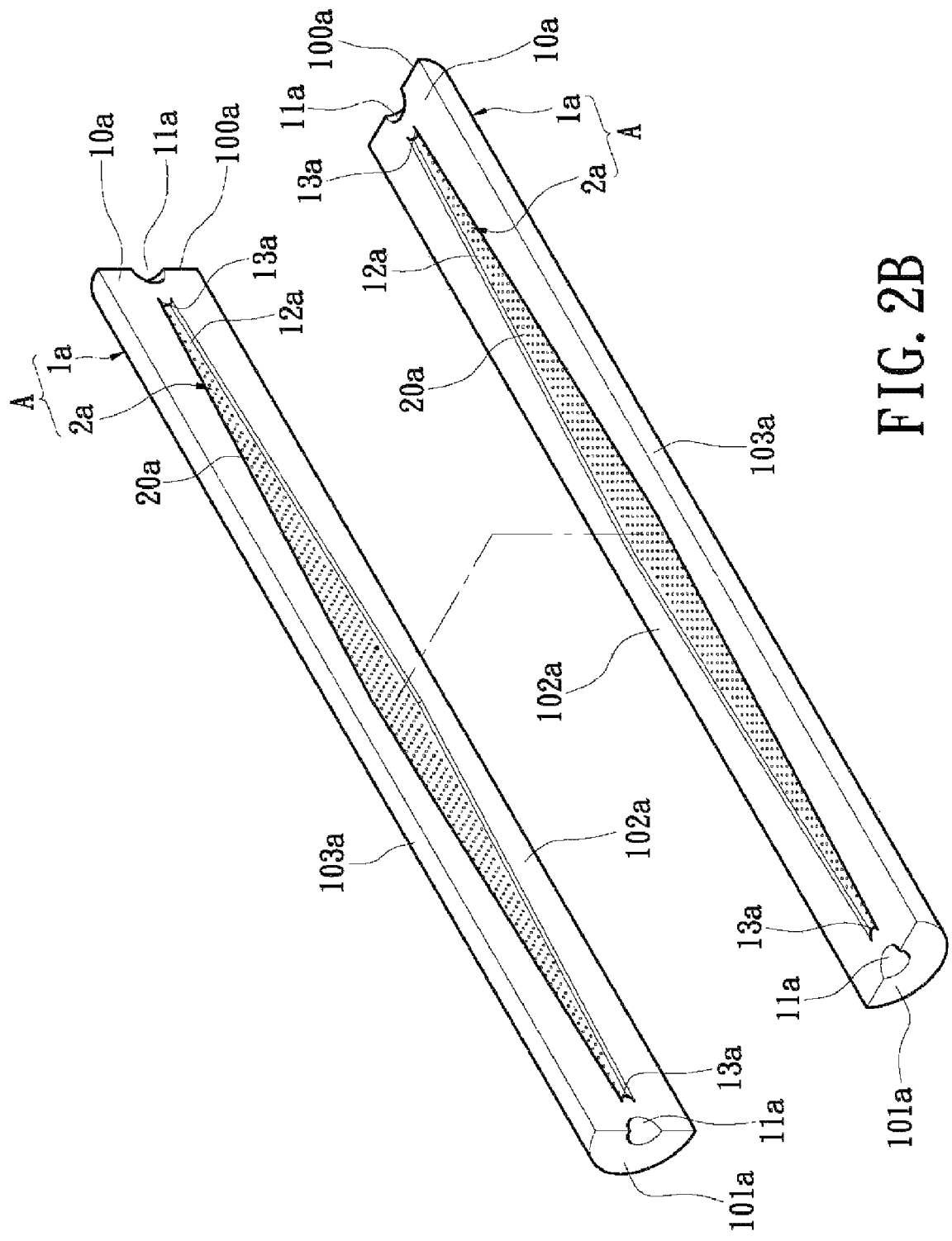
FIG. 2B is a perspective, exploded view of the assembled light-guiding module with high light-guiding efficiency according to the first embodiment of the present invention.
Figure 2C:
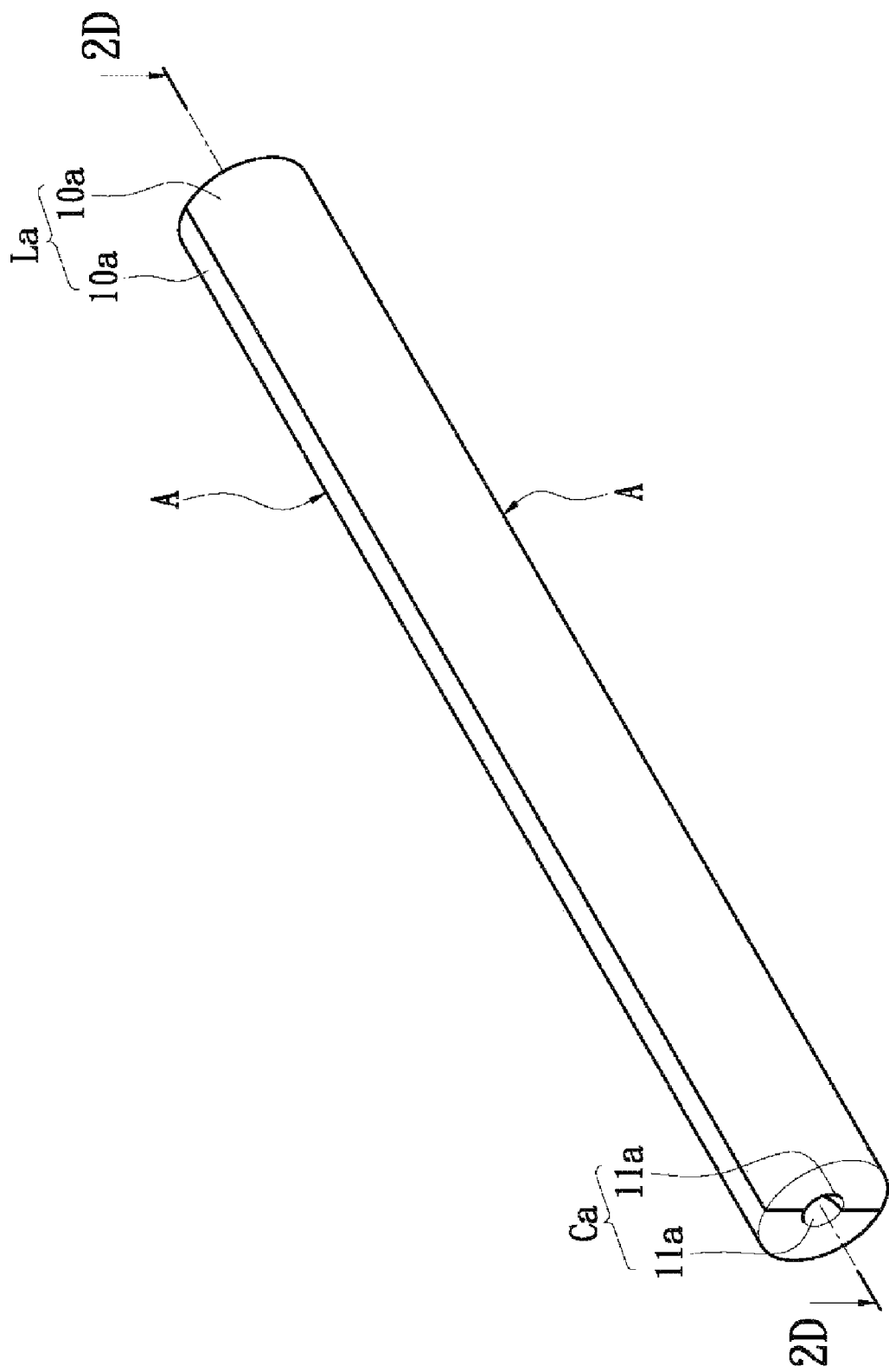
FIG. 2C is a perspective, assembled view of the assembled light-guiding module with high light-guiding efficiency according to the first embodiment of the present invention.
Figure 2D:
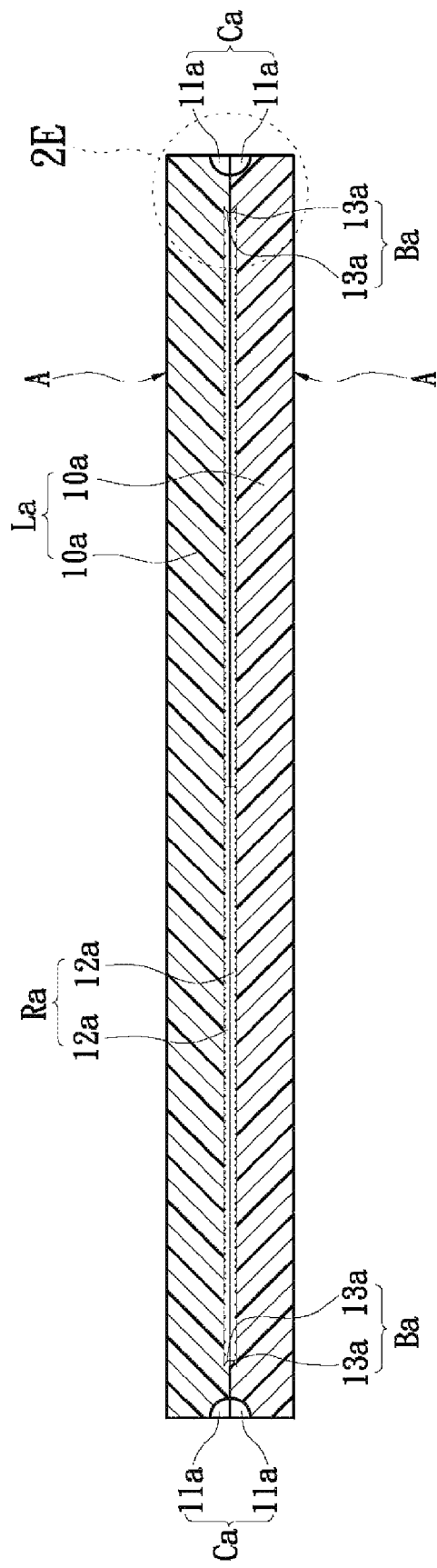
FIG. 2D is a cross-sectional view along line 2D-2D of the assembled light-guiding module with high light-guiding efficiency shown in FIG. 2C.

Referring to FIGS. 2B to 2D, because the light-guiding structures A are assembled together by matching the two mating surfaces 102a, the light-guiding structures A are assembled to form a light pipe La, the four concave light-entering portions 11a are mated to form two light-entering grooves Ca that are respectively formed on two opposite ends of the light pipe La, the two hollow portions 12a are mated to form a cavity space Ra that is embedded in the light pipe La; and the four convex light-entering portions 13a are mated to respectively form two light-entering blocks Ba at two opposite ends of the cavity space Ra. In addition, each light-entering groove Ca has a half arc-shape or a half cone-shape, and each light-entering block Ba has a half arc-shape or a half cone-shape. In the first embodiment, the two shapes of the light-entering groove Ca and the light-entering block Ba are the same as a half arc-shape. Furthermore, the number, the height, or the density of the light-reflecting microstructures 20a is increased progressively along a direction far away from the two light-entering grooves Ca in order to get better optical uniformity, and the light-reflecting microstructures 20a are disposed in the cavity space Ra.

Figure 2E:
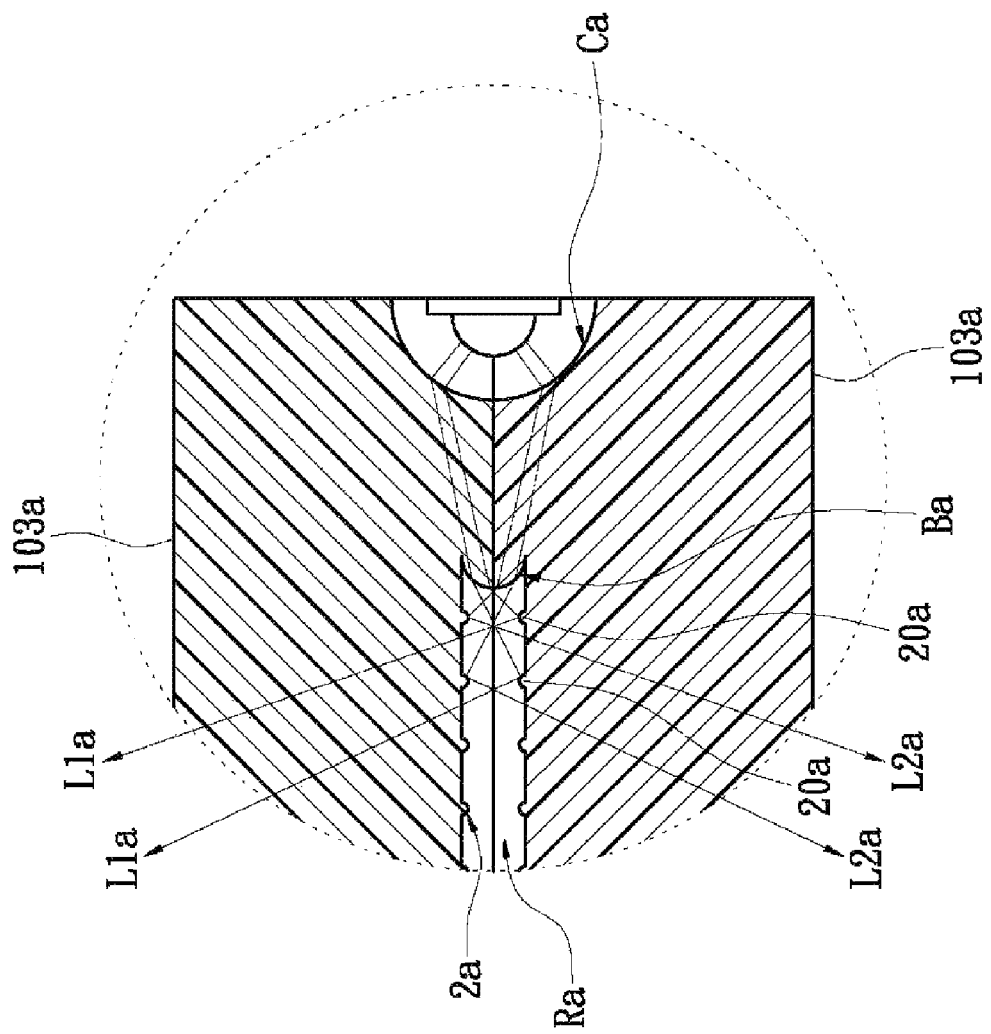
FIG. 2E is a partial, enlarged view of the 2E region as shown in FIG. 2D.

Referring to FIG. 2E, when a light source such as an LED is disposed beside one side of the light-entering groove Ca, the light beams (L1a, L2a) generated by the LED pass through the light-entering groove Ca and the light-entering block Ba and are transmitted efficiently into the cavity space Ra. Finally, the light beam L1a is reflected by the light-reflecting microstructures 20a of one light-reflecting microstructure unit 2a and is projected outwards from one light-exiting surface 103a, and then the light beams L2a is reflected by the light-reflecting microstructures 20a of another light-reflecting microstructure unit 2a and is projected outwards from another light-exiting surface 103a.

Figure 3:
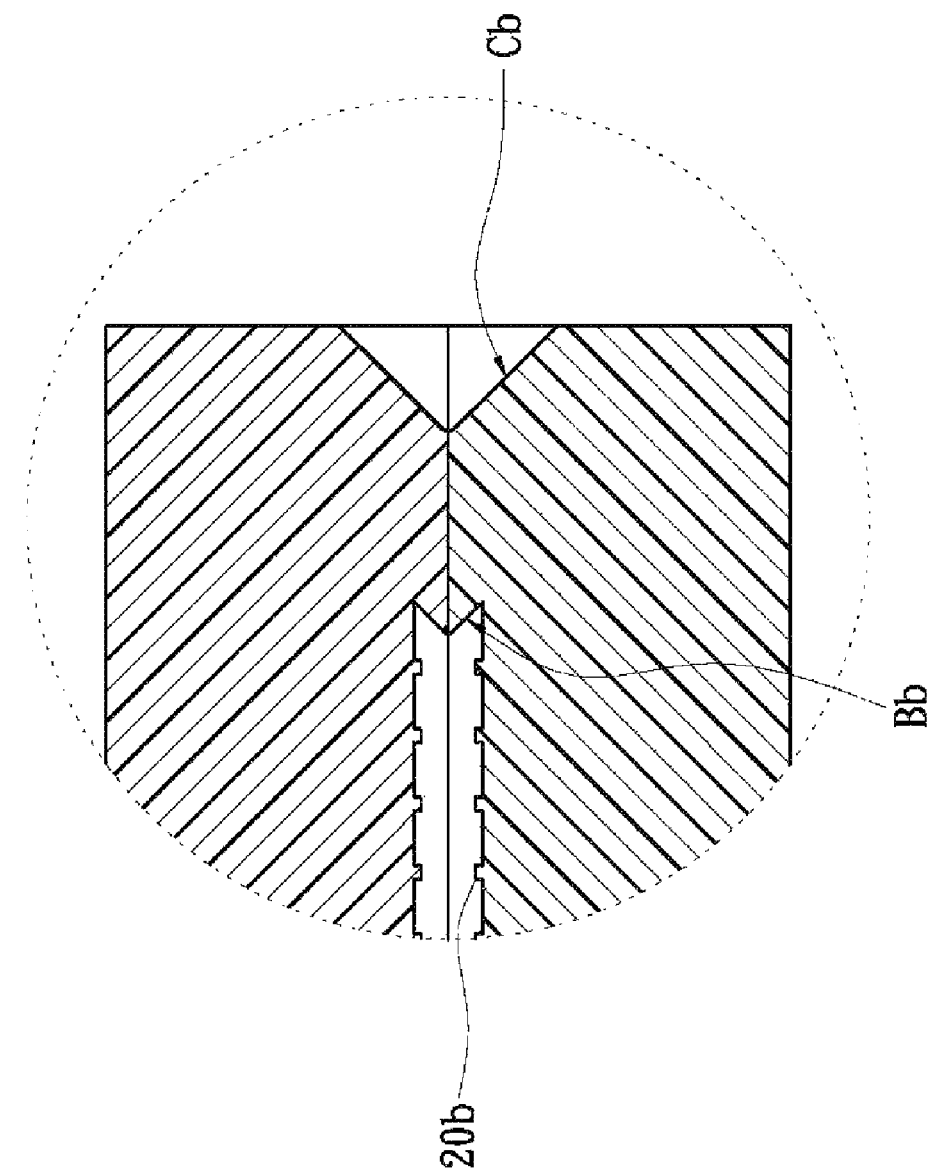
FIG. 3 is a partial, enlarged view of an assembled light-guiding module with high light-guiding efficiency according to the second embodiment of the present invention.

Referring to FIG. 3, the difference between the second embodiment and the first embodiment is that: in the second embodiment, each light-entering groove Cb has a half cone-shape, each light-entering block Bb has a half cone-shape, and each light-reflecting microstructure 20b has a cylindrical shape.

Referring to FIG. 4, the third embodiment of the present invention provides a light-exiting surface 103c that is one surface of a polygon. Hence, when light beams (not shown) are projected outwards from the light-exiting surface 103c, the light beams are condensed by the surfaces (the light-exiting surfaces 103a) of the polygon.

Referring to FIG. 5, the difference between the fourth embodiment and the first embodiment is that: in the fourth embodiment, the present invention provides an assembled light-guiding module with high light-guiding efficiency composed of four light-guiding structures D. Hence, the assembled light-guiding module of the present invention can be composed of two or more than two light-guiding structures according to the requirements of magnitude and the direction of the light-projecting angle.

Each light-guiding portion 1d has two end surfaces (100d, 101d), two mating surface 102d formed between the two end surfaces (100d, 101d) and a light-exiting surface 103d formed between the two end surfaces (100d, 101d) and between the two mating surfaces 102d. The concave light-entering portion 11d is formed between one end surface 101d and the two mating surfaces 102d, and the light-guiding structures D are assembled together by matching the two mating surfaces 102d.

Referring to FIGS. 6A to 6D, the fifth embodiment of the present invention provides an assembled light-guiding module with high light-guiding efficiency composed of a first light-guiding structure E and a second light-guiding structure E'.

The first light-guiding structure E includes a first light-guiding body unit 1e and a light-reflecting microstructure unit 2e. The first light-guiding body unit 1e has a first light-guiding portion 10e, two first concave light-entering portions 11e respectively formed on two opposite ends of the first light-guiding portion 10e, a first hollow portion 12e formed on a plane surface of the first light-guiding portion 10e, and two first convex light-entering portions 13e respectively formed at two opposite ends of the first hollow portion 12e.

The second light-guiding structure E' includes a second light-guiding body unit 1e'. The second light-guiding body unit 1e' has a second light-guiding portion 10e', two second concave light-entering portions 11e' respectively formed on two opposite ends of the second light-guiding portion 10e', a second hollow portion 12e' formed on a plane surface of the second light-guiding portion 10e', and two second convex light-entering portions 13e' respectively formed at two opposite ends of the second hollow portion 12e'. In addition, the light-guiding structures E without the light-reflecting microstructure unit 2e and the light-guiding structures E' has the same shape, so that the light-guiding structures E without the light-reflecting microstructure unit 2e and the light-guiding structures E' can be made using the same mold. Hence, the molding cost of the present invention can be reduced.

According to different requirements, the light-guiding structures E may use only one first concave light-entering portion 11e formed on one end of the first light-guiding portion 10e, and only one first convex light-entering portions 13e formed in the first hollow portion 12e and on one end of the first hollow portion 12e. Similarly, according to other different requirements, the light-guiding structures E' may use only one second concave light-entering portion 11e' formed on one end of the second light-guiding portion 10e', and only one second convex light-entering portions 13e' formed in the second hollow portion 12e' and on one end of the second hollow portion 12e'. Hence, the number and the position of the first concave light-entering portion 11e and the first convex light-entering portions 13e can be adjusted according to different requirements. Similarly, the number and the position of the second concave light-entering portion 11e' and the second convex light-entering portions 13e' can be adjusted according to different requirements.

Moreover, the first light-guiding portion 10e has two first end surfaces (100e, 101e), a first mating surface 102e formed between the two first end surfaces (100e, 101e), and a first light-exiting surface 103e formed between the two first end surfaces (100e, 101e) and opposite to the first mating surface 102e. One first concave light-entering portion 11e is formed between one first end surface 100e and the first mating surface 102e, and another first concave light-entering portion 11e is formed between another first end surface 101e and the first mating surface 102e. The first hollow portion 12e is formed on the first mating surface 102e. In other words, one partial area of the first mating surface 102e is concaved downwards to form a first concave reflective surface as the first hollow portion 12e, and the shape of the first concave reflective surface can be changed according to different requirements of optical uniformities and optical brightness. In addition, the first light-exiting surface 103e can be an arc surface or one surface of a polygon. In the fifth embodiment, the first light-exiting surface 103e is an arc surface. Hence, when light beams (not shown) are projected outwards from the first light-exiting surface 103e, the light beams are condensed by the first light-exiting surface 103e.

In addition, the second light-guiding portion 10e' has two second end surfaces (100e', 101e'), a second mating surface 102e' formed between the two second end surfaces (100e', 101e'), and a second light-exiting surface 103e' formed between the two second end surfaces (100e', 101e') and opposite to the second mating surface 102e'. One second concave light-entering portion 11e' is formed between one second end surface 100e' and the second mating surface 102e', and another second concave light-entering portion 11e' is formed between another second end surface 101e' and the second mating surface 102e'. The second hollow portion 12e' is formed on the second mating surface 102e'. In other words, one partial area of the second mating surface 102e' is concaved downwards to form a second concave reflective surface as the second hollow portion 12e', and the shape of the second concave reflective surface can be changed according to different requirements of optical uniformities and optical brightness. In addition, the second light-exiting surface 103e' can be an arc surface or one surface of a polygon. In the fifth embodiment, the second light-exiting surface 103e' is an arc surface. Hence, when light beams (not shown) are projected outwards from the second light-exiting surface 103e', the light beams are condensed by the second light-exiting surface 103e'.

Furthermore, the light-reflecting microstructure unit 2e has a plurality of light-reflecting microstructures 20e disposed in the hollow portion 12e. Each light-reflecting microstructure 20e has a semi-spherical shape, a cylindrical shape, a triangular prism shape, a saw tooth shape, or other convex shape. In the fifth embodiment, each light-reflecting microstructure 20e has a semi-spherical shape.

Figure 6A:
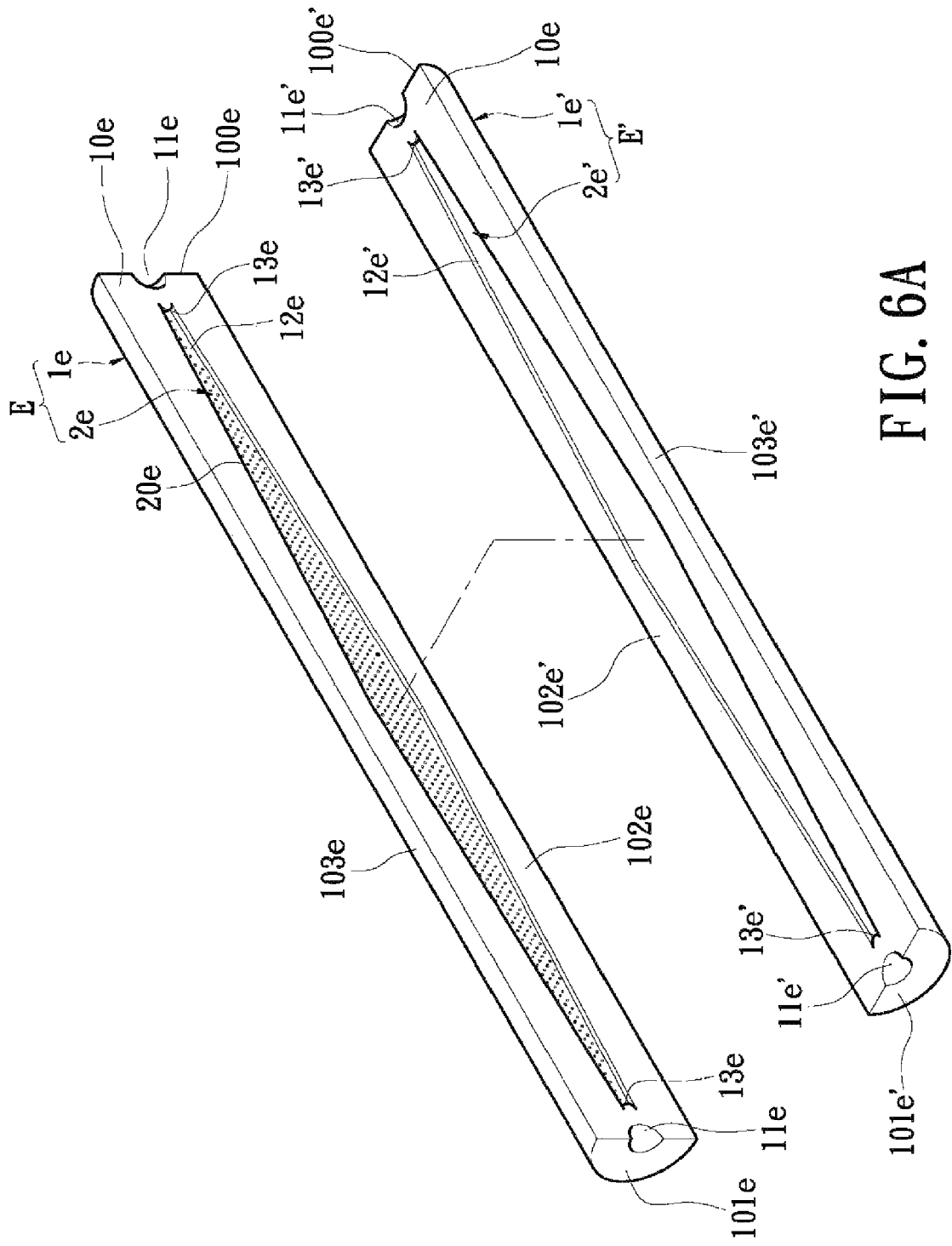
FIG. 6A is a perspective, exploded view of an assembled light-guiding module with high light-guiding efficiency according to the fifth embodiment of the present invention.
Figure 6B:
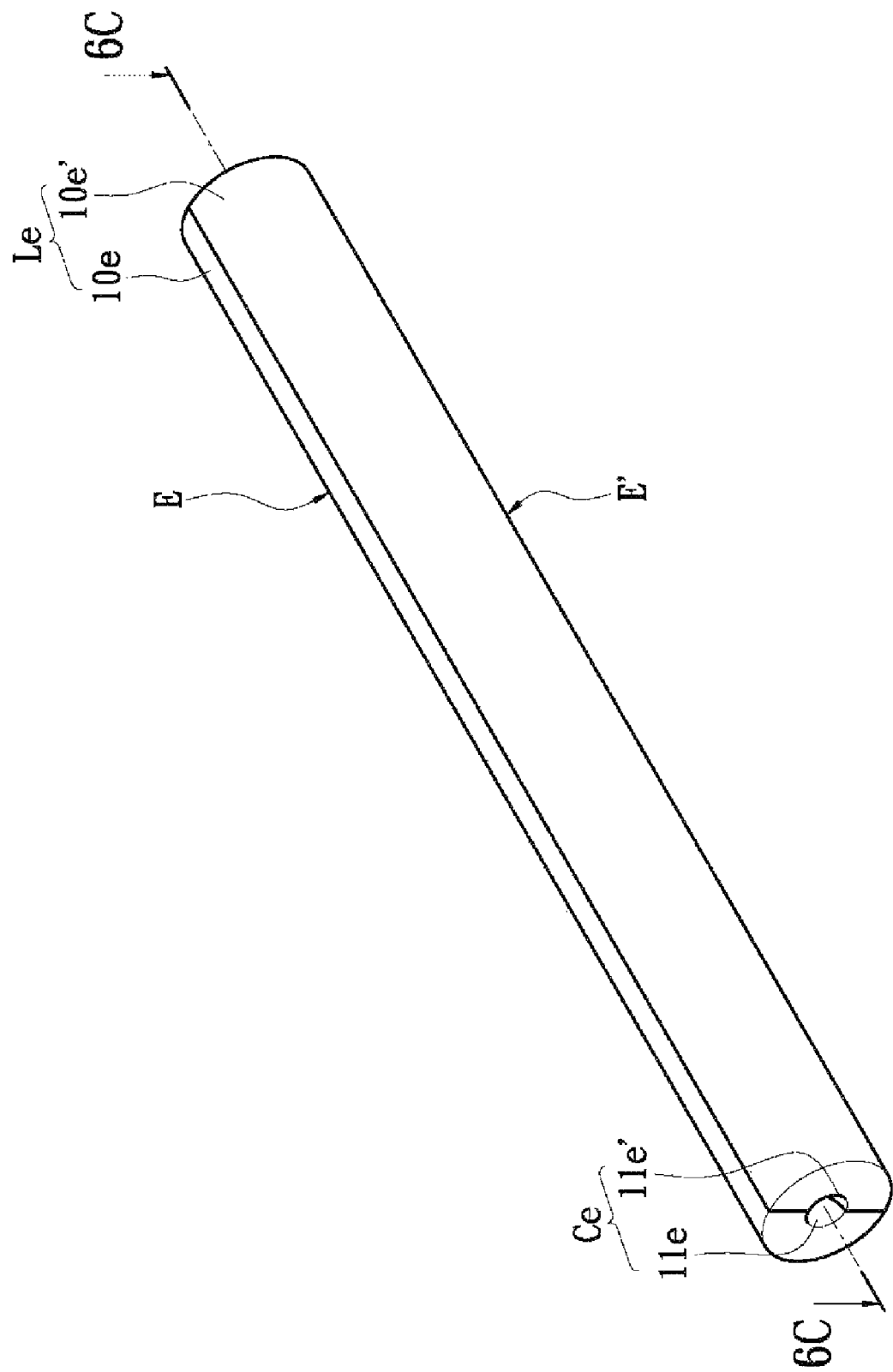
FIG. 6B is a perspective, assembled view of the assembled light-guiding module with high light-guiding efficiency according to the fifth embodiment of the present invention.
Figure 6C:
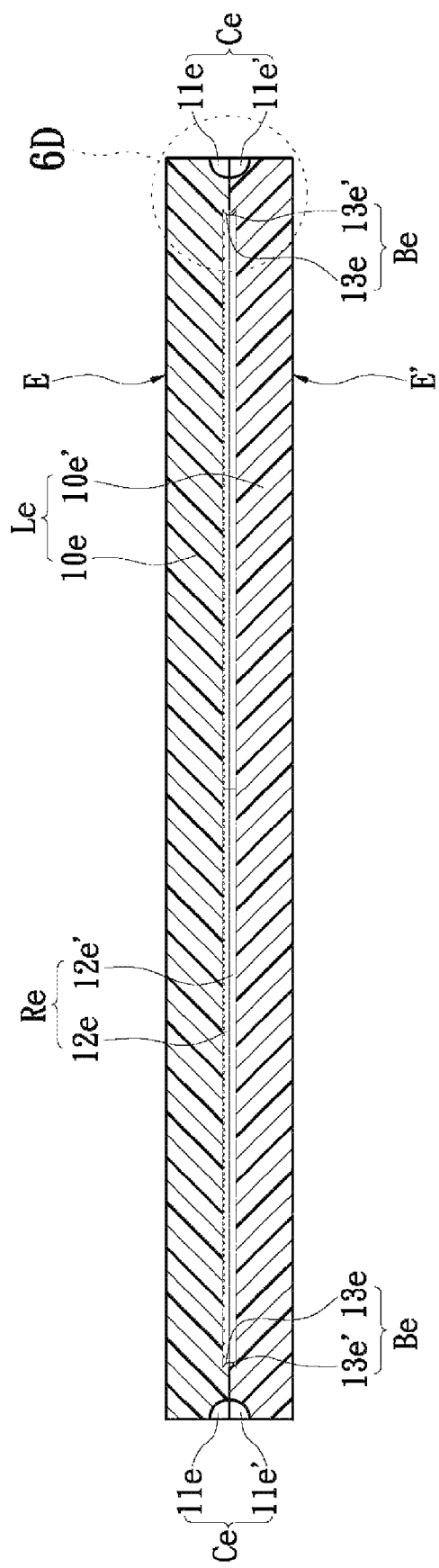
FIG. 6C is a cross-sectional view along line 6C-6C of the assembled light-guiding module with high light-guiding efficiency shown in FIG. 6B.

Referring to FIGS. 6A to 6C, because the first light-guiding structure E and the second light-guiding structure E' are assembled together by matching the first mating surface 102e and the second mating surface 102e'; the first light-guiding structure E and the second light-guiding structure E' are assembled to form a light pipe Le; the two first concave light-entering portions 11e and the two second concave light-entering portions 11e' are mated to form two light-entering grooves Ce that are respectively formed on two opposite ends of the light pipe Le; the first hollow portion 12e and the second hollow portion 12e' are mated to form a cavity space Re that is embedded in the light pipe Le; and the two first convex light-entering portions 13e and the two second convex light-entering portions 13e' are mated to respectively form two light-entering blocks Be at two opposite ends of the cavity space Ra. In addition, each light-entering groove Ce has a half arc-shape or a half cone-shape, and each light-entering block Be has a half arc-shape or a half cone-shape. In the fifth embodiment, the two shapes of the light-entering groove Ce and the light-entering block Be are the same as a half arc-shape. Furthermore, the number, the height or the density of the light-reflecting microstructures 20e is increased progressively along a direction far away from the two light-entering grooves Ce in order to get better optical uniformity, and the light-reflecting microstructures 20e are disposed in the cavity space Re.

Figure 6D:
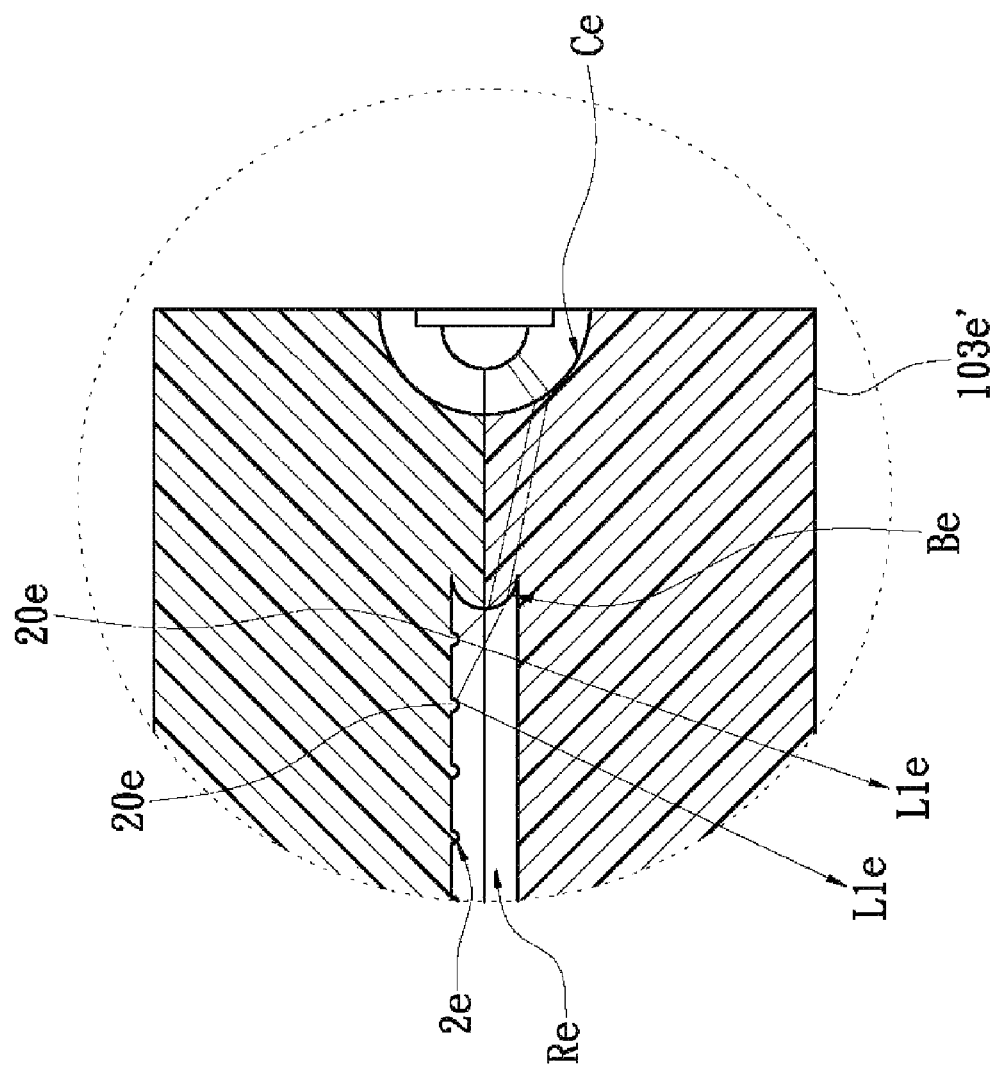
FIG. 6D is a partial, enlarged view of the 6D region as shown in FIG. 6C.

Referring to FIG. 6D, when a light source such as an LED is disposed beside one side of the light-entering groove Ce, the light beams L1e generated by the LED pass through the light-entering groove Ce and the light-entering block Be and are transmitted efficiently into the cavity space Re. Finally, the light beams L1e are reflected by the light-reflecting microstructures 20e of one light-reflecting microstructure unit 2e and are projected outwards from one second light-exiting surface 103e'.

Figure 7:
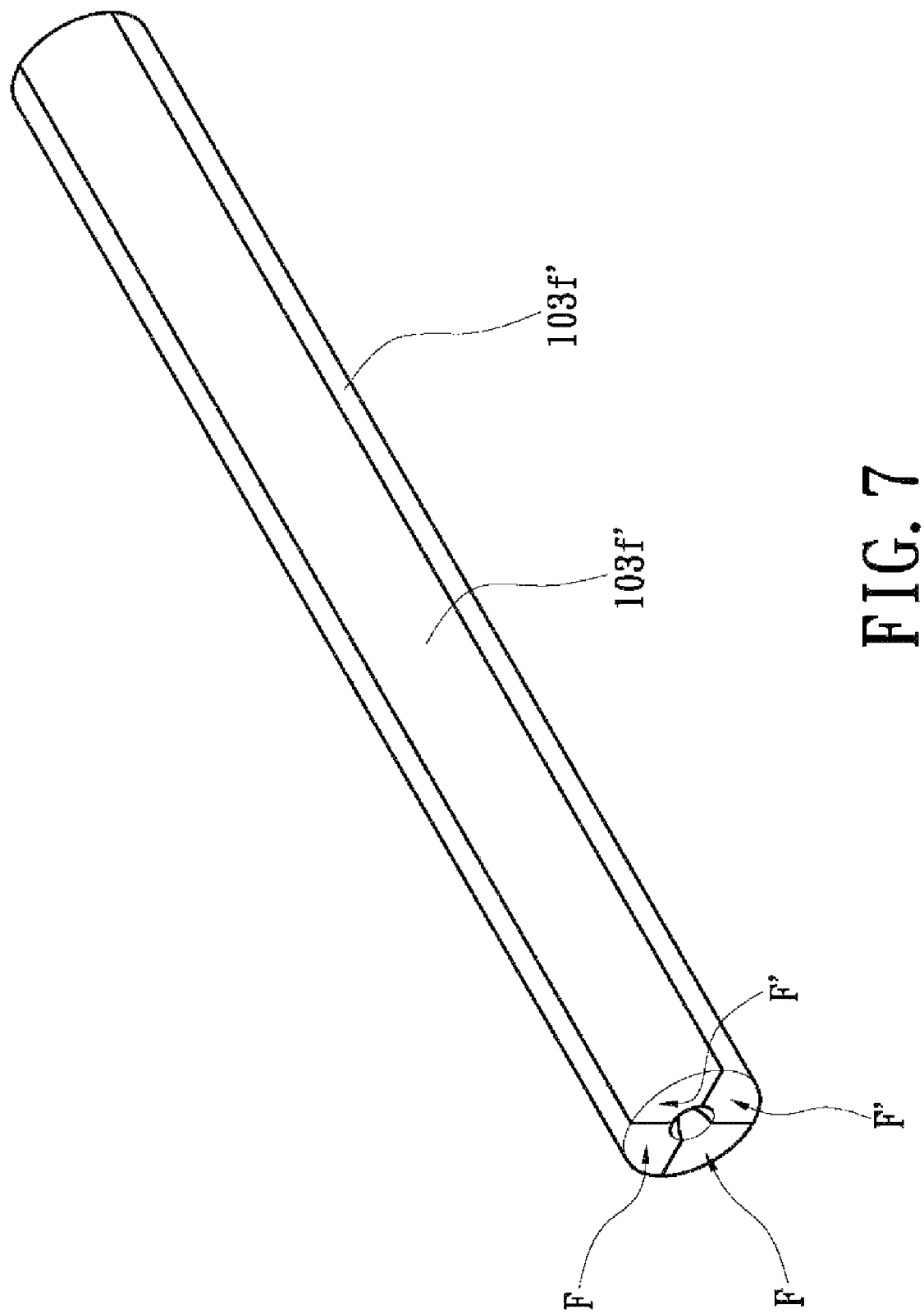
FIG. 7 is a perspective, assembled view of an assembled light-guiding module with high light-guiding efficiency according to the sixth embodiment of the present invention.

Referring to FIG. 7, the difference between the sixth embodiment and the fifth embodiment is that: the sixth embodiment of the present invention provides an assembled light-guiding module with high light-guiding efficiency composed of two first light-guiding structures F and two second light-guiding structures F'. Each first light-guiding structures F has a light-reflecting microstructure unit (not shown) that is the same as the first light-guiding structures 2e of the first light-guiding structures E of the fifth embodiment. Each second light-guiding structures F' without any light-reflecting microstructure unit is the same as the second light-guiding structures E' of the fifth embodiment. Hence, the assembled light-guiding module of the present invention can be composed of two or more than two light-guiding structures (F, F') according to the requirements of magnitude and the direction of the light-projecting angle. For example, if each second light-guiding structures F' has a light-exiting surface 103f', then the light beams is projected outwards from the two light-exiting surfaces 103f'.

In conclusion, the present invention has some advantages, as follows:

1. In the first embodiment, the two light-guiding structures A have the same shape, so that the two light-guiding structures A can be made using the same mold. Hence, the molding cost of the present invention can be reduced.

2. In the first embodiment, according to different requirements, each light-guiding structure A may use only one concave light-entering portion 11a formed on one end of the light-guiding portion 10a and only one convex light-entering portion 13a formed at one end of the hollow portion 12a. Hence, the number and the position of the concave light-entering portions 11a and the convex light-entering portions 13a can be adjusted according to different requirements.

3. In the first embodiment, the light-exiting surface 103a is an arc surface. Hence, when light beams (not shown) are projected outwards from the light-exiting surface 103a, the light beams are condensed by the light-exiting surface 103a.

4. In the first embodiment, when a light source such as an LED is disposed beside one side of the light-entering groove Ca, the light beams (L1a, L2a) generated by the LED pass through the light-entering groove Ca and the light-entering block Ba and are transmitted efficiently into the cavity space Ra. Finally, the light beams L1a are reflected by the light-reflecting microstructures 20a of one light-reflecting microstructure unit 2a and are projected outwards from one light-exiting surface 103a, and then the light beams L2a are reflected by the light-reflecting microstructures 20a of another light-reflecting microstructure unit 2a and are projected outwards from another light-exiting surface 103a.

5. Each light-entering groove can be a concave structure of any shape, each light-entering block can be a convex structure of any shape or the light-entering block can be omitted (it means the light-entering block can be replaced by a plane structure), and each light-reflecting microstructure can be a projecting structure of any shape.

6. In the third embodiment, the light-exiting surface 103c is one surface of a polygon. Hence, when light beams (not shown) are projected outwards from the light-exiting surface 103c, the light beams are condensed by the surfaces (the light-exiting surfaces 103a) of the polygon.

7. In the fourth embodiment, the assembled light-guiding module of the present invention can be composed of two or more than two light-guiding structures according to the requirements of magnitude and the direction of the light-projecting angle.

8. In the fifth embodiment, when a light source such as an LED is disposed beside one side of the light-entering groove Ce, the light beams L1e generated by the LED pass through the light-entering groove Ce and the light-entering block Be and are transmitted efficiently into the cavity space Re. Finally, the light beams L1e are reflected by the light-reflecting microstructures 20e of one light-reflecting microstructure unit 2e and are projected outwards from one second light-exiting surface 103e'.

9. In the sixth embodiment, the assembled light-guiding module of the present invention can be composed of two or more than two light-guiding structures (F, F') according to the requirements of magnitude and the direction of the light-projecting angle.

Although the present invention has been described with reference to the preferred best molds thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. An assembled light-guiding module with high light-guiding efficiency composed of a plurality of light-guiding structures, each light-guiding structure comprising:
a light-guiding body unit having a light-guiding portion, at least one concave light-entering portion formed on one end of the light-guiding portion, and a hollow portion formed on a plane surface of the light-guiding portion, wherein each light-guiding body unit has a convex light-entering portion formed at one end of the hollow portion, and the convex light-entering portions are mated to form a light-entering block that is in the cavity space and on one end of the cavity space; and
a light-reflecting microstructure unit having a plurality of light-reflecting microstructures disposed in the hollow portion;
wherein the light-guiding structures are assembled to form a light pipe, the concave light-entering portions are mated to form a light-entering groove on one end of the light pipe, and the hollow portions are mated to form a cavity space that is embedded in the light pipe.

2. The assembled light-guiding module as claimed in claim 1, wherein the number of the light-guiding structures is two, each light-guiding portion has two end surfaces, a mating surface formed between the two end surfaces, and a light-exiting surface formed between the two end surfaces and opposite to the mating surface, wherein the concave light-entering portion is formed between one of the two end surfaces and the mating surface, the hollow portion is formed on the mating surface, and the light-guiding structures are assembled together by matching the two mating surfaces of the two light-guiding structures.

3. The assembled light-guiding module as claimed in claim 2, wherein the light-exiting surface is an arc surface or one surface of a polygon.

4. The assembled light-guiding module as claimed in claim 2, wherein each light-guiding body unit has another concave light-entering portion formed between another one of the two end surfaces and the mating surface, and the another concave light-entering portions are mated to form another light-entering groove on another end of the light pipe.

5. The assembled light-guiding module as claimed in claim 4, wherein each light-entering groove has a half arc-shape or a half cone-shape.

6. The assembled light-guiding module as claimed in claim 1, wherein each light-guiding portion has two end surfaces, a mating surface formed between the two end surfaces, and a light-exiting surface formed between the two end surfaces and is parallel to the mating surfaces, wherein the concave light-entering portion is formed between one of the two end surfaces and the two mating surfaces, the hollow portion is formed on the mating surface, and the light-guiding structures are assembled together by matching the two mating surfaces of the two light-guiding structures.

7. The assembled light-guiding module as claimed in claim 1, wherein each light-reflecting microstructure is a semi-spherical shape, a cylindrical shape, a triangular prism shape, or a saw tooth shape, and the number, the height, or the density of the light-reflecting microstructures is increased progressively along a direction far away from the light-entering groove.

8. An assembled light-guiding module with high light-guiding efficiency, comprising:
at least one first light-guiding structure, comprising: a first light-guiding body unit having a first light-guiding portion, at least one first concave light-entering portion formed on one end of the first light-guiding portion, and a first hollow portion formed on a plane surface of the first light-guiding portion; and a light-reflecting microstructure unit having a plurality of light-reflecting microstructures disposed in the first hollow portion; and
at least one second light-guiding structure, comprising: a second light-guiding body unit having a second light-guiding portion, at least one second concave light-entering portion formed on one end of the second light-guiding portion, and a second hollow portion formed on a plane surface of the second light-guiding portion;
wherein the first light-guiding structure and the second light-guiding structure are assembled to form a light pipe, the first concave light-entering portion and the second concave light-entering portion are mated to form a light-entering groove on one end of the light pipe, and the first hollow portion and the second hollow portion are mated to form a cavity space that is embedded in the light pipe.

9. The assembled light-guiding module as claimed in claim 8, wherein the first light-guiding body unit has a first convex light-entering portion formed in the first hollow portion and on one end of the first hollow portion, the second light-guiding body unit has a second convex light-entering portion formed in the second hollow portion and on one end of the second hollow portion, and the first convex light-entering portion and the second convex light-entering portion are mated to form a light-entering block that is in the cavity space and on one end of the cavity space.

10. The assembled light-guiding module as claimed in claim 8, wherein the first light-guiding body unit has two first convex light-entering portions respectively formed at two opposite ends of the first hollow portion, the second light-guiding body unit has two second convex light-entering portions respectively formed at two opposite ends of the second hollow portion, and the two first convex light-entering portions and the two second convex light-entering portions are mated to respectively form two light-entering blocks at two opposite ends of the cavity space.

11. The assembled light-guiding module as claimed in claim 10, wherein each light-entering block has a half arc-shape or a half cone-shape.

12. The assembled light-guiding module as claimed in claim 8, wherein the first light-guiding portion has two first end surfaces, a first mating surface formed between the two first end surfaces, and a first light-exiting surface formed between the two first end surfaces and opposite to the first mating surface, wherein the first concave light-entering portion is formed between one of the two first end surfaces and the first mating surface, the first hollow portion is formed on the first mating surface; the second light-guiding portion has two second end surfaces, a second mating surface formed between the two second end surfaces, and a second light-exiting surface formed between the two second end surfaces and opposite to the second mating surface, wherein the second concave light-entering portion is formed between one of the two second end surfaces and the second mating surface, the second hollow portion is formed on the second mating surface; the first light-guiding structure and the second light-guiding structure are assembled together by matching the first mating surface and the second mating surface.

13. The assembled light-guiding module as claimed in claim 12, wherein both the first light-exiting surface and the second light-exiting surface are an arc surface or one surface of a polygon.

14. The assembled light-guiding module as claimed in claim 12, wherein the first light-guiding body unit has another first concave light-entering portion formed between another one of the first two end surfaces and the first mating surface, the second light-guiding body unit has another second concave light-entering portion formed between another one of the second two end surfaces and the second mating surface, and the another first concave light-entering portion and the another second concave light-entering portion are mated to form another light-entering groove on another end of the light pipe.

15. The assembled light-guiding module as claimed in claim 14, wherein each light-entering groove has a half arc-shape or a half cone-shape.

16. The assembled light-guiding module as claimed in claim 8, wherein each light-reflecting microstructure is a semi-spherical shape, a cylindrical shape, a triangular prism shape, or a saw tooth shape, and the number, the height, or the density of the light-reflecting microstructures is increased progressively along a direction far away from the light-entering groove.

17. An assembled light-guiding module with high light-guiding efficiency composed of a plurality of first light-guiding structures and a plurality of second light-guiding structures;

wherein each first light-guiding structure comprises a first light-guiding body unit and a light-reflecting microstructure unit, the first light-guiding body unit has a first light-guiding portion, at least one first concave light-entering portion formed on one end of the first light-guiding portion, and a first hollow portion formed on a plane surface of the first light-guiding portion, and the light-reflecting microstructure unit has a plurality of light-reflecting microstructures disposed in the first hollow portion;

wherein each second light-guiding structure comprises: a second light-guiding body unit having a second light-guiding portion, at least one second concave light-entering portion formed on one end of the second light-guiding portion, and a second hollow portion formed on a plane surface of the second light-guiding portion;

wherein the first light-guiding structure and the second light-guiding structure are assembled to form a light pipe, the first concave light-entering portion and the second concave light-entering portion are mated to form a light-entering groove on one end of the light pipe, and the first hollow portion and the second hollow portion are mated to form a cavity space that is embedded in the light pipe.

* * * * *